July 7, 1964   C. B. GWYN, JR   3,139,669
METHOD OF MAKING AN ELECTRICAL CONTACT
Filed Feb. 23, 1960
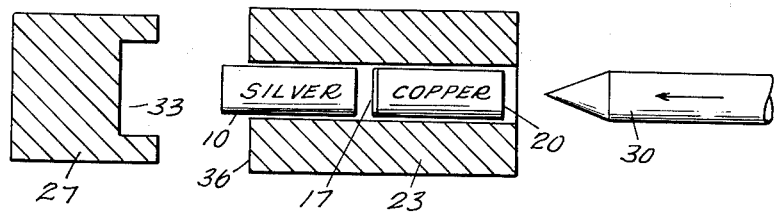
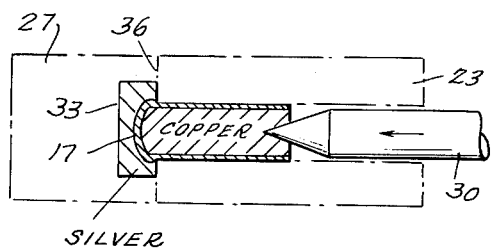
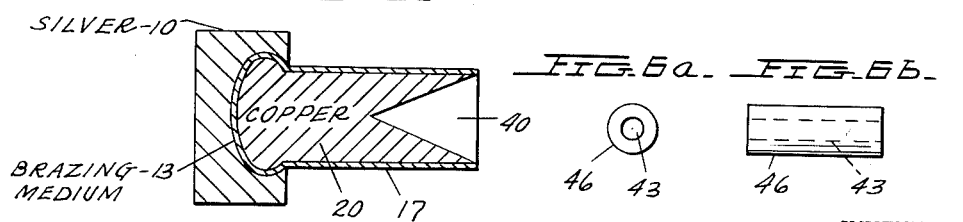
INVENTOR.
CHILDRESS B. GWYN, JR.
BY
OSTROLENK, FABER, GERB & SOFFEN
ATTORNEYS

United States Patent Office 3,139,669
Patented July 7, 1964

3,139,669
METHOD OF MAKING AN ELECTRICAL CONTACT
Childress B. Gwyn, Jr., Export, Pa., assignor to Gibson Electric Company, Delmont, Pa., a corporation of Pennsylvania
Filed Feb. 23, 1960, Ser. No. 10,427
3 Claims. (Cl. 29—155.55)

This invention relates to composite electrical contact rivets and more particularly to a rivet made of two metallic components and the method of assembling the components thereof.

Electrical contacts in rivet form have been made for many years and are, for example, described in United States Patent No. 2,890,315, owned by applicant's assignee.

In the present practice of manufacturing such rivet type electrical contacts the parts of the rivet must be assembled in a fixture with an intermediate brazing or soldering medium between the components, and secured between the components, after which the assembly is subjected to sufficient heat for effecting a weld or brazed condition. Thereafter, the joined components must be allowed to set while cooling. Thus, some three components require handling; namely, the working face material of the rivet, the rivet body itself, i.e. the subhead and shank of the rivet, and a brazing element, for example, a disk of silver solder or the like intermediate the two. This mode of manufacture presents difficulties and is awkward not only from a standpoint of accurately holding the elements in position during brazing, soldering, or welding, but also due to the fact that a difference in thermal expansion of the components causes them to become misaligned or disoriented prior to or upon cooling. Thus, present practice of manufacturing clad or contact assemblies of conventional rivet or screw items has drawbacks as described above, and it is an object of the present invention to overcome such drawbacks by an improved assembly method.

It is another object of the invention to provide an exceedingly strong composite rivet of the electrical contact type wherein the rivet is made less expensively than known rivets by using a working face of a material different than that comprising a supporting subhead backing portion and the shank of the rivet.

A still further object of the invention is to provide a rivet having great mechanical strength and durability.

Yet another object of the invention is to provide an electrical contact rivet having superior operating characteristics at normal and at ambient elevated temperatures.

Yet a further object of the invention is to provide a method of manufacturing electrical contact rivets with a substantially reduced amount of manual labor and skill, as compared with known methods.

Other objects and features of the invention will be apparent to those skilled in the art from the description to follow.

Briefly, my invention contemplates assembling a rivet of two components, for example, a head of silver and a rivet subhead and shank of copper. The shank is coated with a suitably selected brazing compound and an end of the shank is driven into the silver head portion. Both of these elements are essentially cylindrical, rod-like pieces at the start of the process. However, the silver head is forced into a die having concavity of suitable shape, while the copper element is then driven into the other end of the silver element, all by means of suitable die elements. The end of the copper element which is driven into the silver component mushrooms out, forming a rivet subhead of complementary shape within the silver, and, thus, locks mechanically and securely to the silver. However, by providing an interface coating between the silver and copper elements, while mechanical interlocking is effected, then heating the combination to an extent that the brazing coating interface effects alloying or fusion of the silver and copper elements, an integral unit results.

A detailed description of my invention now follows in conjunction with the appended drawing, in which:

FIGURES 1a and 1b show, respectively, in elevation, an end view and a longitudinal view of a silver element forming one of the components of my invention.

FIGURES 2a and 2b show, respectively, an end view and a longitudinal view of the copper element of my invention.

FIGURE 3 is an exploded view partially in cross-section showing the first step in the process of assembling the silver and copper elements.

FIGURE 4 is a view partially in cross-section showing the partially completed assembling step.

FIGURE 5 illustrates the completed electrical contact rivet in cross-section.

FIGURES 6a and 6b show a different type of copper element usable in my process having a core of brazing material.

Referring now to the drawings, FIGURES 1a and 1b show a cylindrical silver element or segment 10 which will become the working face of a contact rivet. A cylindrical copper element or segment 20 is disclosed in FIGURES 2a and 2b which is provided, either over its external surface, or at an end surface with a suitable brazing or soldering material 17 of any conventional kind and which will become the shank and integral subhead of the rivet.

The coating of the copper segment may be effected in any conventional mode as by spraying, dipping, drag-through, etc.

Referring now to FIGURE 3, it will be seen that the copper and silver segments have been placed in a bored guide block die element 23 and that the silver element 10 faces a die 27 having a concavity 33, while the copper element faces a ram 30 movable in the direction of the arrow as shown.

Referring now to FIGURE 4, it will be noted that the ram 30 is moving leftwards and is pushing the copper element into the silver element, which silver element is expanding into concavity 33 of the die block 27 and is being extruded radially to fill the cavity. At the same time, the end 36 of the block 23 completes the closure of the open face of the cavity to fully entrap the silver therein. It will be noted that the left end of the copper segment is being distorted outwardly by the force of the ram 30, the point of which is being pushed into the right end of copper element to form the conical opening 40 (FIGURE 5), and in this distorting action, the copper segment forms a subhead which mushrooms into the silver segment while expanding and spreading the interface brazing material at 17 between the two segments. The final condition is as shown in FIGURE 5. The two segments are now firmly secured together by mechanical interlock readily handled for heat processing. Thus, the silver segment has become a contact rivet head while the copper segment has become the rivet shank. Upon being heated by conventional methods, they will fuse or alloy at the interface 13 by virtue of the well known action of the brazing coating.

Although I have shown the brazing coating 17 as being applied as a cladding of the outer surface of the copper segment or at one end of the copper segment, it will be appreciated that it could just as well be applied to that end (FIGURE 1b) of the silver segment adjacent to the copper segment or, for that matter, a separate silver alloy or solder disk could be attached to the end of the copper segment instead of the brazing coating.

As a further alternative, a suitable brazing or tinning compound might be applied as a core within the copper segment. For example, as seen in FIGURES 6a and 6b, such a core 43 may be inserted within a copper segment 46. In any event, the purpose of such coating or core is to provide a suitable soldering, tinning, or brazing interface between the copper and silver components, which interface, between the copper and silver components, is spread out following the mushroom pattern of the copper subhead as it spreads, effected by heavy pressure of the ram 30. Inasmuch as the copper is of somewhat harder material than the silver, the effect is to produce a filling of cavity 33 by extrusion or expansion of the silver while the consequent physical reaction effects mushrooming of the working end of the copper segment so as to interlock within the silver. It will, of course, be appreciated that the core 43 need not extend completely through the copper segment, but may be entrapped within a blind bore, the opening to which faces the silver segment.

The details of the process are not critical and persons skilled in the art will understand that there are other suitable materials which may be utilized for forming a composite electrical contact rivet in accordance with my teaching, and I do not deem it essential that the shank and subhead of the rivet, that is, the segment 20 be harder than the head of the rivet, namely the element 10, in order to effect the process. Due to the confining effect of the die elements 23 and 27, it is possible that the same mushrooming of the shank and extrusion of the head can be effected within a large selection of materials, or with two copper segments or two silver segments. The speed and pressure with which the ram acts, of course, depends upon the nature of the materials being assembled and their size.

The particular brazing component used is, of course, subject to suitable selection and all materials needed for proper practice of my invention are presently commercially obtainable. Likewise, the time and temperature aspects of producing final bonding of the rivet subhead and working face element is dependent upon particular metals, size, and nature of coating interface used. For example, an interface of tin might require a heat of five minutes duration at 700° F. in air, a silver brazing medium might require a ten minute heat at 1400° F. in hydrogen, etc.

Insofar as the method described above is concerned, it will be apparent that there is no need to hold two or three elements in rigid alignment as by a fixture while they are being brazed or soldered to form the head and shank of a contact rivet. The considerable improvement brought about as compared with the prior art method is evident; namely, the two initial segments of the rivet are merely forced under ram pressure so that one segment is pushed into the other segment and forces it or distorts it into a rivet head shape within the suitable confines of a die block. Thereafter, the composite article, being mechanically strong, can be readily handled and heated for integral brazing or soldering without resort to aligning fixtures or other impediments.

Regarding the rivet itself as produced by my method, it will be apparent that a strong head and shank attachment is effected and by virtue of the fact that the subhead and integral shank is of a metal of relatively lower cost than contact facing metals, a more economical rivet results by virtue of applying the required contact facing material for use in the electrical contact process only as a surface on the working face of my composite rivet.

Having thus described my invention I am aware that various changes may be made without departing from the spirit thereof and, accordingly, I do not seek to be limited to the precise illustration herein given except as set forth in the following claims.

I claim:
1. A method of making an electrical make-and-break contact element having a head and a shank, which comprises
   (a) providing a first die member having an enlarged cavity of a diameter of the desired diameter of said head and a second die member having a bore of a diameter of the desired diameter of said shank in aligned, juxtaposed relation;
   (b) placing a pair of aligned metallic segments in said bore, a first of said segments being constituted of copper for forming the shank of said contact element and the second of said segments being constituted of fine silver for forming the head of said contact element;
   (c) interposing an alloying element constituted of a material selected from the group consisting of tin and silver brazing media between said segments within said bore;
   (d) applying a compressive force against the outer end of said copper shank segment within said bore to force the end of said copper shank segment adjacent the silver head segment into the latter thereby producing a mushroom-like configuration mechanically interlocking said segments, and simultaneously expanding the silver head segment substantially throughout said cavity, the alloying element defining an alloying interface therebetween; and
   (e) heat treating the thus interlocked segments to melt the alloying element and effect wetting and alloying of the head and shank segment to form an integral composite contact element.

2. The method as defined in claim 1, in which the alloying element is constituted of a tin solder, and in which the mechanically interlocked copper and silver segments are heated for five minutes at 700° F. in air to effect alloying of the copper and silver components.

3. The method as defined in claim 1, in which the alloying element is constituted of a silver brazing medium and in which the mechanically interlocked copper and silver segments are heated for 10 minutes at 1400° F. in a hydrogen atmosphere to effect alloying of the copper and silver components.

References Cited in the file of this patent

UNITED STATES PATENTS

| | | |
|---|---|---|
| 1,130,077 | Eldred | Mar. 2, 1915 |
| 1,826,543 | Hervig et al. | Oct. 6, 1931 |
| 1,826,549 | Jardine | Oct. 6, 1931 |
| 2,049,771 | Gwyn | Aug. 4, 1936 |
| 2,070,424 | Duncan | Feb. 9, 1937 |
| 2,199,240 | Gwyn | Apr. 30, 1940 |
| 2,216,510 | Burns | Oct. 1, 1940 |
| 2,322,845 | Goldsworthy | June 29, 1943 |
| 2,568,242 | Matteson | Sept. 18, 1951 |
| 2,624,820 | Payette | Jan. 6, 1953 |
| 2,739,369 | Cooney | Mar. 27, 1956 |
| 2,739,370 | Cooney | Mar. 27, 1956 |
| 2,779,998 | Bailey | Feb. 5, 1957 |
| 2,955,222 | Beesch | Oct. 4, 1960 |
| 3,026,603 | Zysk et al. | Mar. 27, 1962 |

OTHER REFERENCES

| | | |
|---|---|---|
| 815,136 | Great Britain | June 17, 1959 |